(12) United States Patent
Hosea

(10) Patent No.: US 10,505,431 B1
(45) Date of Patent: Dec. 10, 2019

(54) BRUSHLESS DUAL ROTOR ELECTROMAGNETIC INDUCTION MOTOR

(71) Applicant: Harold O. Hosea, West Chester, OH (US)

(72) Inventor: Harold O. Hosea, West Chester, OH (US)

( * ) Notice: Subject to any disclaimer, the term of this patent is extended or adjusted under 35 U.S.C. 154(b) by 277 days.

(21) Appl. No.: 15/450,780

(22) Filed: Mar. 6, 2017

(51) Int. Cl.
*H02K 16/02* (2006.01)

(52) U.S. Cl.
CPC .................. *H02K 16/02* (2013.01)

(58) Field of Classification Search
CPC .............................. H02K 16/02; H02K 51/00
USPC .......................................................... 310/114
See application file for complete search history.

(56) References Cited

U.S. PATENT DOCUMENTS

| | | | |
|---|---|---|---|
| 1,223,095 A | 4/1917 | Neuland | |
| 1,227,185 A | 5/1917 | Neuland | |
| 1,246,643 A | 11/1917 | Neuland | |
| 3,070,733 A * | 12/1962 | Ziegler | H02K 41/025 310/13 |
| 3,990,087 A * | 11/1976 | Marks | G03B 35/10 396/331 |
| 3,990,857 A | 11/1976 | Marks et al. | |
| 4,178,090 A * | 12/1979 | Marks | G03B 35/10 352/60 |
| 4,178,890 A | 12/1979 | Marks et al. | |
| 4,437,745 A | 3/1984 | Hajinal | |
| 4,525,045 A | 6/1985 | Fazekas | |
| 4,678,298 A | 7/1987 | Perisic | |
| 6,373,160 B1 | 4/2002 | Schrödl | |
| 6,643,396 B1 | 11/2003 | Hendricks et al. | |
| 6,794,781 B2 | 9/2004 | Razzell et al. | |
| 6,815,857 B2 | 11/2004 | Akatsu | |
| 6,819,488 B2 | 11/2004 | Zanen | |
| 7,545,429 B2 | 6/2009 | Travis | |
| 8,355,019 B2 | 1/2013 | Eichenlaub | |

(Continued)

FOREIGN PATENT DOCUMENTS

GB           224905 A  *  7/1925 ............. H02K 17/04

OTHER PUBLICATIONS

US 9,108,863 B1, 04/2015, Hoeijmakers (withdrawn)
(Continued)

*Primary Examiner* — Alex W Mok
(74) *Attorney, Agent, or Firm* — Mark Malek; Widerman Malek, PL

(57) ABSTRACT

A brushless dual rotor electromagnetic induction motor with an inner exciter rotor having a rotatable drive/input shaft, the inner exciter rotor generating a rotating magnetic field when the drive/input shaft is rotated, an outer carrier rotor surrounding the inner exciter rotor and being co-axial and concentric therewith, the outer carrier rotor having a rotatable carrier frame and a plurality of conductive elements, an electrical current being induced to flow through each of the conductive elements in response to the rotating magnetic field generated by the inner exciter rotor, a rotatable driven/output shaft which rotates in response to rotation of the rotatable carrier frame, and an outer stator surrounding the outer carrier rotor which interacts with the induced electrical current flowing through the conductive elements of the outer carrier rotor to thereby cause the rotatable carrier frame of the outer carrier rotor to rotate.

19 Claims, 11 Drawing Sheets

(56) References Cited

U.S. PATENT DOCUMENTS

| | | | |
|---|---|---|---|
| 8,466,592 B2 | 6/2013 | Atallah et al. | |
| 8,653,677 B2 * | 2/2014 | West | F02B 37/00 |
| | | | 290/1 C |
| 9,018,863 B2 * | 4/2015 | Hoeijmakers | B60K 6/26 |
| | | | 318/79 |
| 2006/0264296 A1 | 11/2006 | Moeller | |
| 2007/0096574 A1 * | 5/2007 | Romagny | B60K 6/26 |
| | | | 310/112 |
| 2007/0290563 A1 | 12/2007 | Zhao et al. | |
| 2011/0121672 A1 * | 5/2011 | Calverley | H02K 1/08 |
| | | | 310/103 |
| 2011/0121673 A1 * | 5/2011 | Edwards | H02K 7/11 |
| | | | 310/103 |
| 2011/0141241 A1 | 6/2011 | Lee et al. | |
| 2011/0156518 A1 * | 6/2011 | Bright | H02K 19/106 |
| | | | 310/103 |
| 2013/0134815 A1 * | 5/2013 | Powell | H02K 7/1823 |
| | | | 310/101 |
| 2013/0234553 A1 * | 9/2013 | Kusase | H02K 16/02 |
| | | | 310/114 |
| 2014/0124276 A1 | 5/2014 | Ramamoorthy et al. | |
| 2015/0270754 A1 | 9/2015 | Kusase | |
| 2016/0079835 A1 * | 3/2016 | Aoyama | H02K 16/02 |
| | | | 310/68 D |
| 2016/0079836 A1 * | 3/2016 | Aoyama | H02K 16/02 |
| | | | 310/68 D |
| 2016/0248307 A1 * | 8/2016 | Kubota | H02K 16/02 |
| 2017/0025977 A1 * | 1/2017 | Armstrong | B60L 1/00 |
| 2018/0212502 A1 * | 7/2018 | Finkle | H02K 1/223 |

OTHER PUBLICATIONS

Zheng et al., "Analysis and Experiment of a Novel Brushless Double Rotor Machine for Power-Split Hybrid Electrical Vehicle," Energies, 6(7), pp. 3209-3223.

* cited by examiner

BRUSHLESS DUAL ROTOR ELECTROMAGNETIC INDUCTION MOTOR

FIELD OF THE INVENTION

The present invention broadly relates to a device comprising a brushless dual rotor electromagnetic induction motor. The present invention also broadly relates to use of such motors for vehicular and stationary power.

BACKGROUND

During the use of machines powered by internal combustion engines, fuel is consumed and pollution may be generated roughly in proportion to the amount of fuel consumed. Moreover, depending upon whether the internal combustion engine is operated at its peak efficiency configuration, the use of internal combustion engines entails varying degrees of inefficiency in the conversion of fuel to power.

One way to reduce the fuel usage and increase the efficiency of machines that utilize internal combustion engine power is to provide, for example, a hybrid drive system wherein the internal combustion engine provides power that is converted to electric power and used to electrically drive the machine. In a typical hybrid drive system, an electric motor may be coupled to an electrical generator. The generator may receive power from the motor for storage or may provide power to the motor for traction. However, such hybrid drive systems may still involve a certain amount of inefficiency in power transfer and conversion between the motor and generator entities, as well as material used in its construction.

SUMMARY

According to a first broad aspect of the present invention, there is provided a device comprising a brushless dual rotor electromagnetic induction motor, the induction motor comprising:
  an inner exciter rotor having a rotatable drive/input shaft, the inner exciter rotor generating a rotating magnetic field when the drive/input shaft is rotated;
  an outer carrier rotor surrounding the inner exciter rotor and being co-axial and concentric therewith, the outer carrier rotor having a rotatable carrier frame and one or more conductive elements associated with the rotatable carrier frame such that an electrical current can be induced to flow through the conductive elements in response to the magnetic field as the drive/input shaft rotates;
  a rotatable driven/output shaft which rotates in response to rotation of the rotatable frame; and
  an outer stator surrounding the outer carrier rotor and proximate the conductive elements which interacts with the induced electrical current flowing through the conductive elements to thereby cause the rotatable carrier frame to rotate.

According to a second broad aspect of the present invention, there is provided a device comprising a brushless dual rotor electromagnetic induction motor, the induction motor comprising:
  a rotatable drive/input shaft;
  an inner exciter rotor generating a rotating magnetic field when the drive/input shaft is rotated, the inner exciter rotor having:
    a coil mount having a central hub section mounted on the drive/input shaft, and a plurality of coil mounting sections radiating outwardly from the central hub section; and
    a plurality of electrical induction coils, each of the mounting sections receiving one of the electrical induction coils;
  an outer carrier rotor surrounding the inner exciter rotor and being co-axial and concentric therewith, the outer carrier rotor having:
    a plurality of conductive carrier induction plates; and
    a rotatable carrier frame mounted for rotation about an axis defined by the drive/input shaft, the rotatable carrier frame comprising:
      a forward carrier induction plate mounting hub;
      a rear carrier induction plate mounting hub spaced apart laterally spaced apart from the forward carrier induction plate mounting hub; and
      a plurality of induction plate mounting brackets connected to the forward and rear induction plate mounting hubs for receiving and securing the carrier induction plates, the induction plates being circumferentially spaced about the axis defined by the drive/input shaft, and such that an electrical current is induced to flow through each of the carrier induction plates in response to the rotating magnetic field generated by the inner exciter rotor;
  a driven/output shaft connected to the rotatable carrier frame for rotation about the axis of the drive/input shaft when the rotatable carrier frame rotates; and
  an outer stator surrounding the outer carrier rotor which interacts with the induced electrical current flowing through the conductive induction plates to thereby cause the rotatable carrier frame to rotate about the axis defined by the drive/input shaft, the outer stator having:
    a plurality of circumferentially spaced apart and electrically conductive stator bars each having a pair of spaced apart ends;
    a forward annular-shaped shorting ring for receiving and securing one end of each of the stator bars; and
    a rear annular-shaped shorting ring laterally spaced apart from the forward shorting ring for receiving and securing the other end of each of the stator bars.

According to a third broad aspect of the present invention, there is provided a device comprising a brushless dual rotor electromagnetic induction motor, the induction motor comprising:
  a rotatable drive/input shaft;
  an inner exciter rotor generating a rotating magnetic field when the drive/input shaft is rotated, the inner exciter rotor having:
    a coil mount having a central hub section mounted on the drive/input shaft, and a plurality of coil mounting sections radiating outwardly from the central hub section; and
    a plurality of electrical induction coils, each of the mounting sections receiving one of the electrical induction coils;
  an outer carrier rotor surrounding the inner exciter rotor and being co-axial and concentric therewith, the outer carrier rotor having:
    a plurality of conductive carrier elements; and
    a rotatable carrier frame mounted for rotation about an axis defined by the drive/input shaft, the rotatable carrier frame comprising:

a forward carrier mounting hub;

a rear carrier mounting hub spaced apart laterally spaced apart from the forward carrier mounting hub; and a generally cylindrically-shaped central carrier section associated with the forward and rear carrier mounting hubs for receiving and securing the conductive carrier elements, the central carrier section having a central bore formed therein through which the drive/input shaft extends, the conductive carrier elements being circumferentially spaced apart by central carrier section about the axis defined by the drive/input shaft, and such that an electrical current is induced to flow through each of the conductive carrier elements in response to the rotating magnetic field generated by the inner exciter rotor;

a driven/output shaft connected to the rotatable carrier frame for rotation about the axis of the drive/input shaft when the rotatable carrier frame rotates; and an outer stator surrounding the outer carrier rotor which interacts with the induced electrical current flowing through the conductive carrier elements to thereby cause the rotatable carrier frame to rotate about the axis defined by the drive/input shaft, the outer stator having:

a plurality of circumferentially spaced apart and electrically conductive stator bars each having a pair of spaced apart ends;

a forward annular-shaped shorting ring for receiving and securing one end of each of the stator bars; and a rear annular-shaped shorting ring laterally spaced apart from the forward shorting ring for receiving and securing the other end of each of the stator bars.

BRIEF DESCRIPTION OF THE DRAWINGS

The invention will be described in conjunction with the accompanying drawings, in which.

DETAILED DESCRIPTION

Figure 1:
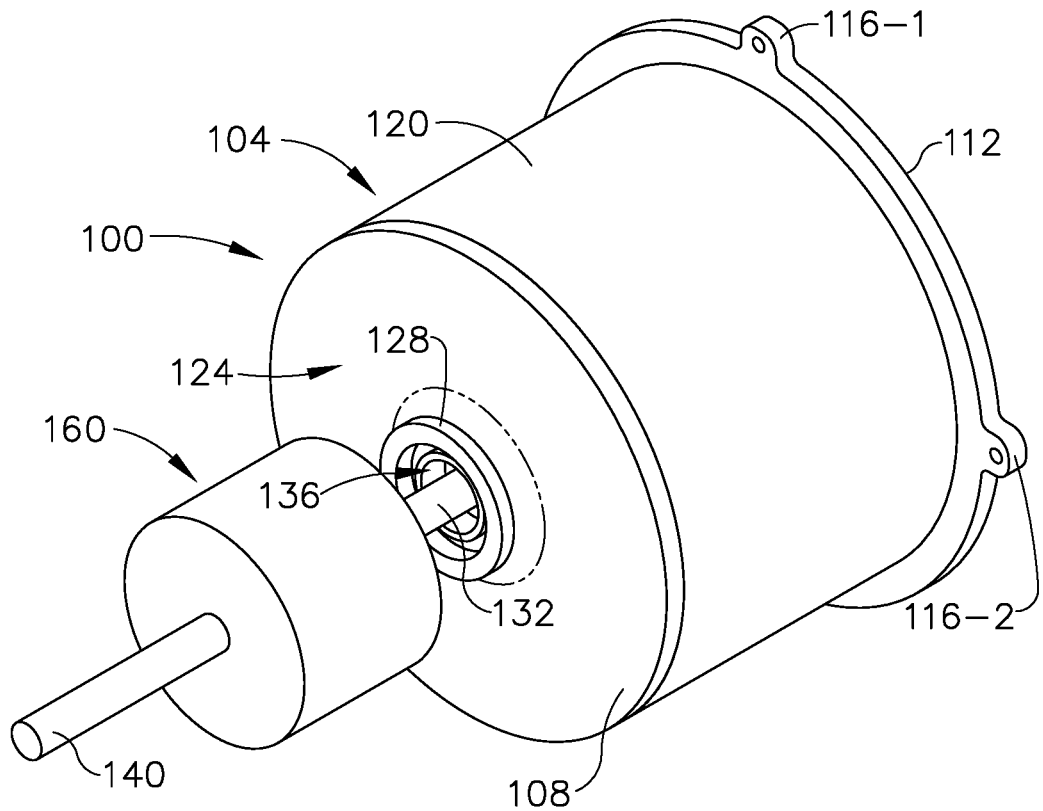
FIG. 1 is a perspective view of the forward drive/input shaft end of an embodiment of the device of the present invention, in combination with an electrical generator.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, directional terms such as "outer," "inner," "upper," "lower," "top," "bottom," "side," "front," "frontal," "forward," "rear," "rearward," "back," "trailing," "above," "below," "leftward," "rightward," "horizontal," "vertical," "upward," "downward," "underside," "outside," "outer," etc., are merely used for convenience in describing the various embodiments of the present invention. For example, the embodiment shown in FIGS. 1 through 8 may be flipped over, rotated by 90° or 180° in any direction, etc.

For the purposes of the present invention, the term "device" may be used interchangeably herein with the terms machine, equipment, apparatus, etc., and may refer in various contexts to one device, a plurality of devices, the entire device(s), a portion of the device(s), a component of the device(s), an element of the device(s), etc.

For the purposes of the present invention, the term "brushless motor" refers to an electric motor (e.g., an electromagnetic induction motor) which does not use, employ, require, etc., solid electrical contact components known as "brushes" to conduct electrical current directly between stationary electrical conductors (e.g., wires) and moving elements, such as, for example, a rotating shaft, i.e., does not use, employ, require, etc., mechanical commutation. For example, brushless motors do not use, employ, require, etc., a commutator or slip rings (i.e., electromechanical components that allow the transmission of power and electrical signals from a stationary to a rotating structure by direct electrical contact) affixed to, mounted on, associated with, etc., to the rotating shaft, as well as spring press braided wire brushes on, attached to, etc., the rings in order to conduct the electrical current.

For the purposes of the present invention, the term "rotor" refers to a rotatable component, unit, element, etc., which rotates around, about, etc., a longitudinal axis.

For the purposes of the present invention, the term "dual rotor motor" refers to a motor having a pair of rotors. In embodiments of the present invention, the pair of rotors comprise concentric and co-axial inner and outer rotors.

For the purposes of the present invention, the term "electromagnetic induction motor" refers to an electric motor in which the electric current flowing in a rotor is needed to produce the torque (rotation) obtained by electromagnetic induction (interaction) with the magnetic field of a stator, the magnetic field of the stator being generated by electrical current being induced therein by the rotor.

For the purposes of the present invention, the term "exciter rotor" refers to the rotor of the electromagnetic induction motor which generates a rotating magnetic field as it rotates and thus induces (excites) an electrical current in the conductive elements of a carrier rotor.

For the purposes of the present invention, the term "carrier rotor" refers to the rotor of the electromagnetic induction motor which has one or more conductive elements in which an electrical current is induced by the exciter rotor. The electrical current induced in the one or more conductive elements of the carrier rotor then interacts with a stator which reacts to the induced electrical current in the carrier rotor to thus cause rotation of the carrier rotor.

For the purposes of the present invention, the term "stator" refers to the stationary component of the electromagnetic induction motor which reacts to the induced electrical current in the carrier rotor to thereby cause the carrier rotor to rotate. An example of such a stator may be a "squirrel cage-type" stator which may comprise a pair of laterally spaced apart annular shorting rings which are connected together by a plurality circumferentially spaced apart stator bars.

For the purposes of the present invention, the terms "drive shaft" and "input shaft" refer interchangeably to the shaft which causes the exciter rotor to rotate, and may referred to collectively as the "drive/input shaft."

For the purposes of the present invention, the terms "driven shaft" and "output shaft" refer interchangeably to the shaft associated with the carrier rotor which rotates (is driven) in response to the rotation of the carrier rotor, and may referred to collectively as the "driven/output shaft.".

For the purposes of the present invention, the term "rotatable" refers to a component which may be rotated (torque) around, about, etc., a longitudinal axis.

For the purposes of the present invention, the term "co-axial" refers to components (e.g., rotors) which share a common longitudinal axis.

For the purposes of the present invention, the term "concentric" refers to components (e.g., rotors) which share a common central longitudinal axis.

For the purposes of the present invention, the term "electrical current" refers to a flow of an electric charge through a component, element, etc., comprised at least partially of an electrically conductive material.

For the purposes of the present invention, the term "electrical generator" refers to a device that converts mechanical energy to electrical energy for use in an electrical circuit. The source of mechanical energy may include, for example, a shaft driven by an internal combustion engine. An electrical generator producing a direct current (DC) may be referred to herein as a dynamo. An electrical generator producing a alternating current (AC) may be referred to herein as an alternator.

For the purposes of the present invention, the term "magnetic field" refers to the magnetic effect generated, caused, etc., by an electric current moving (flowing) in an electrically conductive component, element, etc., or by a component element, etc., comprising a magnetic material (e.g., a permanent magnet).

For the purposes of the present invention, the term "electrically conductive material" refers to a materially such as copper, aluminum, alloys of copper or aluminum, etc., which permits the movement (flow) of electrical current therethrough.

For the purposes of the present invention, the term "electromagnetic induction" refers to the production of an electromotive force (i.e., a voltage) across an electrically conductive material, component, element, etc., by exposure to a varying (moving, rotating, etc.) magnetic field(s).

For the purposes of the present invention, the term "induced" and "induction" refer interchangeably to the creation, generation, etc., of an electrical current in an electrically conductive component, element, etc., by a moving (e.g., rotating) magnetic field.

For the purposes of the present invention, the term "subassembly" refers to the combination, association, etc., of two or more components, units, elements, etc., of a device which form less than the entire, complete, etc., assembly of the device.

For the purposes of the present invention, the term "comprising" means various devices, components, elements, capabilities, steps, etc., may be conjointly employed in embodiments of the present invention. Accordingly, the term "comprising" encompasses the more restrictive terms "consisting essentially of" and "consisting of."

For the purposes of the present invention, the terms "a" and "an" and similar phrases are to be interpreted as "at least one" and "one or more." References to "an" embodiment in this disclosure are not necessarily to the same embodiment.

For the purposes of the present invention, the term "and/or" means that one or more of the various devices, components, elements, capabilities, steps, etc., may be employed in embodiments of the present invention.

DESCRIPTION

Embodiments of the present invention relate to a device which comprises a brushless dual rotor electromagnetic induction motor. The induction motor includes: an inner exciter rotor having a rotatable drive/input shaft, the inner exciter rotor generating a rotating magnetic field (e.g., due to permanent magnets or an electrical current associated with the exciter rotor) when the drive/input shaft is rotated; an outer carrier rotor surrounding the inner exciter rotor and being co-axial and concentric therewith, the outer carrier rotor having a rotatable carrier frame and one or more conductive elements associated with the frame such that an electrical current can be induced to flow through the conductive elements in response to the magnetic field as the drive/input shaft rotates; a rotatable driven/output shaft, which may be connected to or otherwise associated with the rotatable carrier frame, and which rotates in response to (or in conjunction with) the rotation of the rotatable frame; and an outer stator surrounding the outer carrier rotor and proximate the conductive elements which interacts with the induced electrical current flowing through the conductive elements to thereby cause the rotatable carrier frame to rotate.

In an embodiment of the brushless dual rotor electromagnetic induction motor of the present invention, the inner exciter rotor may have an electrical current passing through one or more electrical coils which are internally mounted on the drive/input shaft to generate a rotating magnetic field when the shaft is rotated. In another embodiment, the inner exciter rotor may have one or more permanent magnets mounted on the drive/input shaft to generate the rotating magnetic field when the shaft is rotated.

In another embodiment of the brushless dual rotor electromagnetic induction motor of the present invention, the induction motor may comprise a rotatable drive/input shaft and an inner exciter rotor generating a rotating magnetic field when the drive/input shaft is rotated. The inner exciter rotor may comprise: a coil mount having a central hub section mounted on the drive/input shaft; and a plurality of coil mounting sections radiating outwardly from central hub section; and a plurality of electrical induction coils, each of the mounting sections receiving one of the electrical induction coils. This embodiment of the induction motor may further comprise an outer carrier rotor surrounding the inner exciter rotor and being co-axial and concentric therewith. This outer carrier rotor may comprise: a plurality of conductive elements in the form of carrier induction plates; and a rotatable carrier frame mounted for rotation about an axis defined by the drive/input shaft. This rotatable carrier frame may comprise: a forward carrier induction plate mounting hub; a rear carrier induction plate mounting hub laterally spaced apart from the forward carrier induction plate mounting hub; and a plurality of induction plate mounting brackets connected to the forward and rear induction plate mounting hubs for receiving and securing the carrier induction plates. The induction plates are circumferentially spaced about the axis defined by the drive/input shaft, and such that an electrical current may be induced to flow through each of the carrier induction plates in response to the rotating magnetic field generated by the inner exciter rotor. This induction motor may further comprise a driven/output shaft connected to the rotatable carrier frame for rotation about the axis of the drive/input shaft when the rotatable carrier frame rotates, as well as an outer stator surrounding the outer carrier rotor which interacts with the induced electrical current flowing through the conductive elements to thereby cause the rotatable carrier frame to rotate about the axis defined by the drive/input shaft. This outer stator may have: a plurality of circumferentially spaced apart and electrically conductive stator bars each having a pair of spaced apart ends; a forward annular-shaped shorting ring for receiving and securing one end of each of the stator bars; and a rear annular-shaped shorting ring laterally spaced apart from the forward shorting ring for receiving and securing the other end of each of the stator bars.

In yet another embodiment of the brushless dual rotor electromagnetic induction motor of the present invention, this rotatable carrier frame may comprise: a forward carrier mounting hub; a rear carrier mounting hub laterally spaced apart from the forward carrier mounting hub; and a generally cylindrically-shaped central carrier section associated with the forward and rear carrier mounting hubs for receiving and securing the conductive carrier elements, the central carrier section having a central bore formed therein through which the drive/input shaft extends, The conductive carrier elements though which an electrical current is induced to flow through in response to the rotating magnetic field generated by the inner exciter rotor may be in the form of, for example, carrier induction plates which may be received and releasably secured by circumferentially spaced apart slots provided by or formed in the central carrier section, or may be in the form of, wire induction coils which may be received and releasably secured by, for example, corresponding and aligned pairs of notches formed in the front and back surfaces of the central carrier section.

In operation, as the drive/input shaft rotates, the rotating magnetic field generated by the rotating inner (exciter) rotor induces an electrical current in the conductive elements (e.g., induction plates) mounted on or otherwise associated with the rotatable frame of the outer carrier rotor. As the induced electrical current flows through the conductive elements of the outer carrier rotor, the outer stator, which is proximate the conductive elements of the outer carrier rotor, interacts with induced electrical current in the conductive elements, thus causing the outer carrier rotor to rotate, as well as the driven/output shaft which may be associated with, connected to, etc., the rotatable carrier frame and which rotates in response to rotation of the rotatable conductive frame/outer carrier rotor. In addition, and unlike, for example, a commutator in an electrical motor which requires conductive "brushes" for electrical contact to act as a power switch, embodiments of the dual rotor electromagnetic induction motor of the present invention are brushless.

In one embodiment of use of the brushless dual rotor electromagnetic induction motor of the present invention, an engine, such as an internal or external combustion engine, rotates the drive/input shaft, which may, for example, be connected, attached, etc., to a transmission (e.g., geared to the transmission) of the internal/external combustion engine. An in-line electrical generator (e.g., dynamo or alternator) which generates the electrical current passing through the electrical coils of the inner exciter rotor may be mounted on or otherwise associated with the drive/input shaft. The electrical generator may be electrically connected to the inner exciter rotor, for example, by wires internal to the drive/input shaft, or externally carried within, for example, recesses or grooves formed in the perimeter of the drive/input shaft to transmit electrical current from the generator to the inner exciter rotor. In an alternative embodiment of use of the brushless dual rotor electromagnetic induction motor of the present invention, the drive/input shaft may be rotated by, for example, a drive pulley system.

Figure 2:
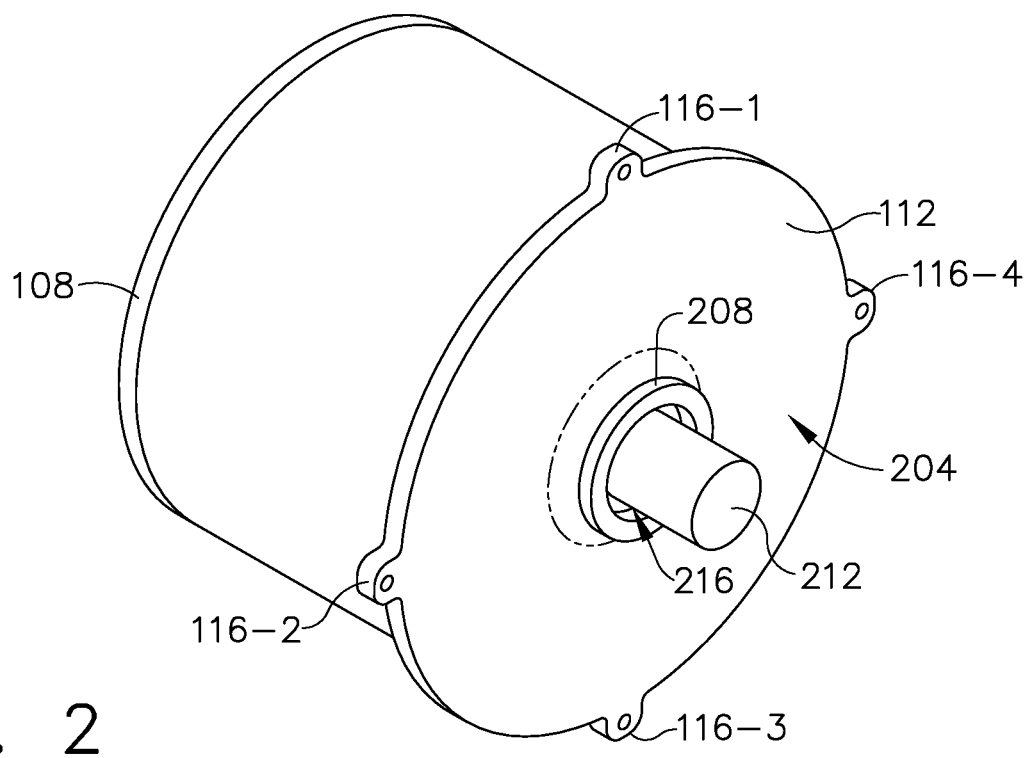
FIG. 2 is perspective view of the rearward driven/output shaft end of the embodiment of the device shown in FIG. 1.

An embodiment of the brushless dual rotor electromagnetic induction motor of the present invention is further illustrated in FIGS. 1 through 8. FIGS. 1 and 2 illustrate the forward drive/input shaft end, as well as the rearward driven/output shaft end, respectively, of the brushless dual rotor electromagnetic induction motor, indicated generally as 100. Motor 100 may comprise an outer housing, casing, etc., indicated generally as 104 which encompasses and surrounds the various internal components, units, elements, subassemblies, etc., of motor 100. Housing 104 may include a front, forward, etc., portion, plate, etc., indicated as 108 and shown in FIGS. 1 and 2 as having a generally circular-shaped configuration. Housing 104 may also include back, rear, etc., portion, plate, base, etc., indicated as 112, and shown in FIGS. 1 and 2 as also having a circular-shaped configuration. As further shown in FIGS. 1 and 2, rear housing portion 112 may be provided with, for example, securement tabs, indicated as 116-1 through 116-4, along the outer perimeter of portion 112 for securing motor 100 to other components, units, elements, etc., motor 100 is associated with. (If needed, front housing portion 108 may also be provided with securement tabs similar to 116-1 through 116-4, along the outer perimeter thereof, for securing motor to other components, units, elements, etc., motor 100 is associated with.) Housing 104 may also include a central main portion, indicated as 120, which is shown in FIGS. 1 and 2 as being generally cylindrical-shaped but which also has a hollow interior for encompassing the internal components, units, elements, subassemblies, etc., of motor 100, and which connects front housing portion 108 to rear housing portion 112. Main housing portion 120 may also be integral with rear housing portion 112, with front housing portion 108 being removably secured to main housing portion 112 to reveal and allow access to the internal components, units, elements, subassemblies, etc., of motor 100.

In FIG. 1, the forward, frontal, drive/input shaft end of motor 100 is indicated generally by arrow 124. As also shown in FIG. 1, a forward bearing mount, indicated generally as 128, is provided for front housing portion 108 and is located at or proximate the center of portion 108. A generally cylindrical-shaped drive/input shaft, indicated generally as 132, is received by bearing mount 128 through a generally cylindrical bore, indicated by arrow 136. Also shown in FIG. 1 and positioned on drive/input shaft 132 between forward end 140 of shaft 132 and motor 100 is an electrical generator, indicated generally as 160. (If needed, electrical generator 160 may also be provided with securement tabs similar to 116-1 through 116-4 along the outer perimeter thereof for securing electrical generator 160 to other components that motor 100 is housed in.) Drive/input shaft 132 may be rotated by (driven), for example, an internal/external combustion engine, by a pulley system, etc.

In FIG. 2, the rear, back, driven/output shaft end of motor 100 is indicated generally by arrow 204. As also shown in FIG. 2, a rear bearing mount, indicated generally as 208, is provided for rear housing portion 112 and is located at or proximate the center of portion 112. A generally cylindrical-shaped driven/output shaft, indicated generally as 212, is received by bearing mount 208 through a generally cylindrical-shaped bore, as indicated by arrow 216.

Figure 3:
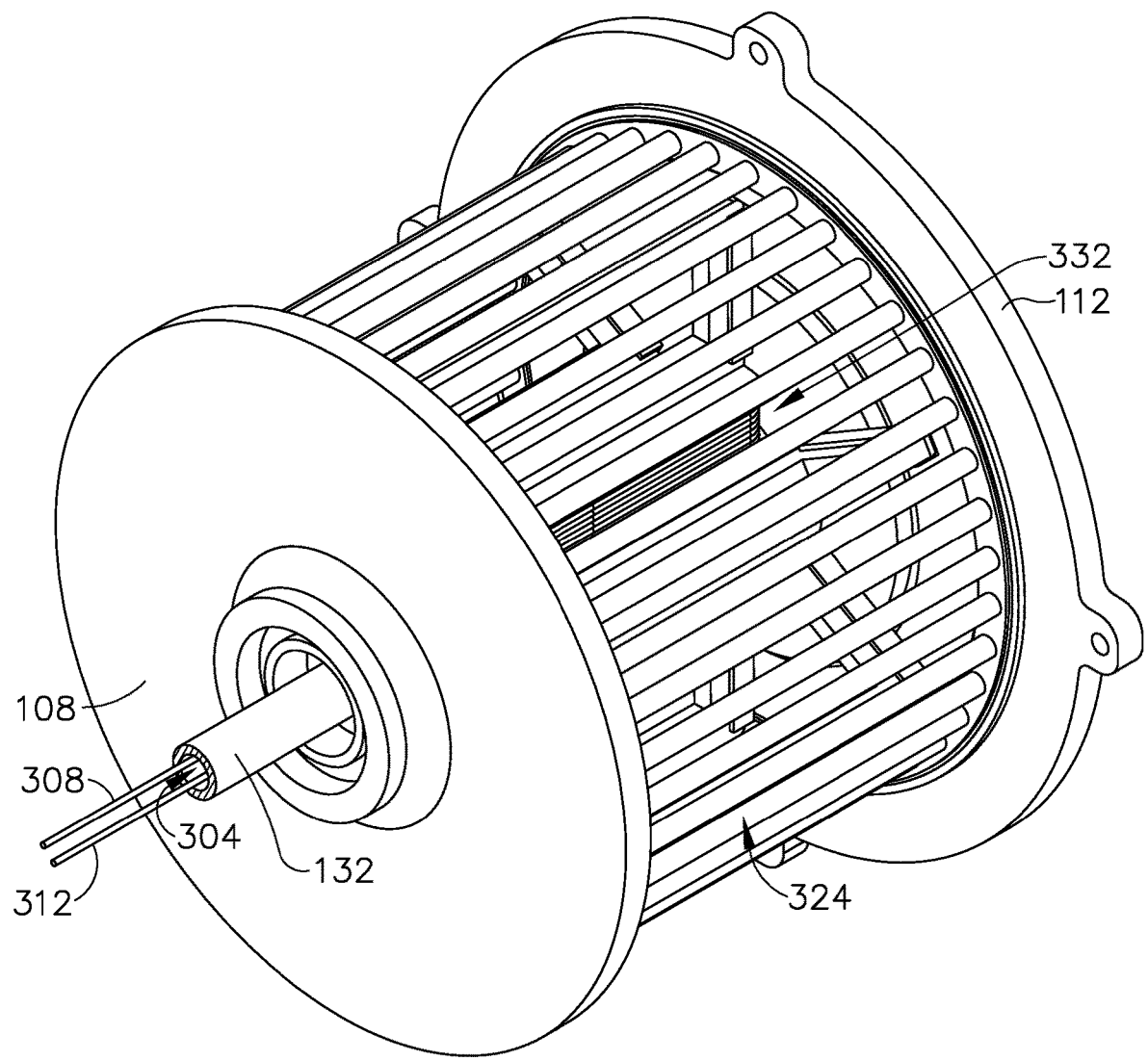
FIG. 3 is another perspective view of the embodiment of the device similar to that shown in FIG. 1 but with a portion of the housing, casing, etc., of the device removed.

Referring to FIG. 3, drive/input shaft 132 is provided with a generally cylindrical-shaped bore therethrough, indicated generally as 304, for receiving a pair of wires, indicated respectively as 308 and 312. Also shown in FIG. 3, the internal assembly of motor 100 comprises an outer stator, indicated generally by arrow 324, as well as an exciter/carrier subassembly, indicated generally by arrow 332. (Although not shown, outer stator 324 may secured to, mounted to, etc., for example, the inner surface 444, of housing 104.) As further shown in FIG. 4, subassembly 332 comprises an inner exciter rotor, indicated generally by arrow 404, which may be secured to, mounted on, associated with, etc., drive/input shaft 132 (see also FIG. 5), and an outer carrier rotor, indicated generally by arrow 420, which completely surrounds inner exciter rotor 404 and is co-axial and concentric therewith and which may be secured to, mounted on, associated with, etc., driven/output shaft 212 (see also FIG. 5). Outer carrier rotor 404 includes a relatively rigid structure shown in the form a carrier frame, indicated generally as 424, which is rotatable about the axis defined by shaft 132. Subassembly 332 comprising the inner exciter rotor 404 and the surrounding outer carrier rotor, together with the surrounding outer stator 324, is positioned within the interior space, indicated generally by arrow 432, of housing 104 defined by inner surface 436 of forward housing portion 108, inner surface 440 of main housing portion 120, and inner surface 444 of rear housing portion 112. Inner surface 440 of main housing portion 120 which surrounds and is adjacent to outer stator 324 may also be provided with an insulating material.

Figure 5:
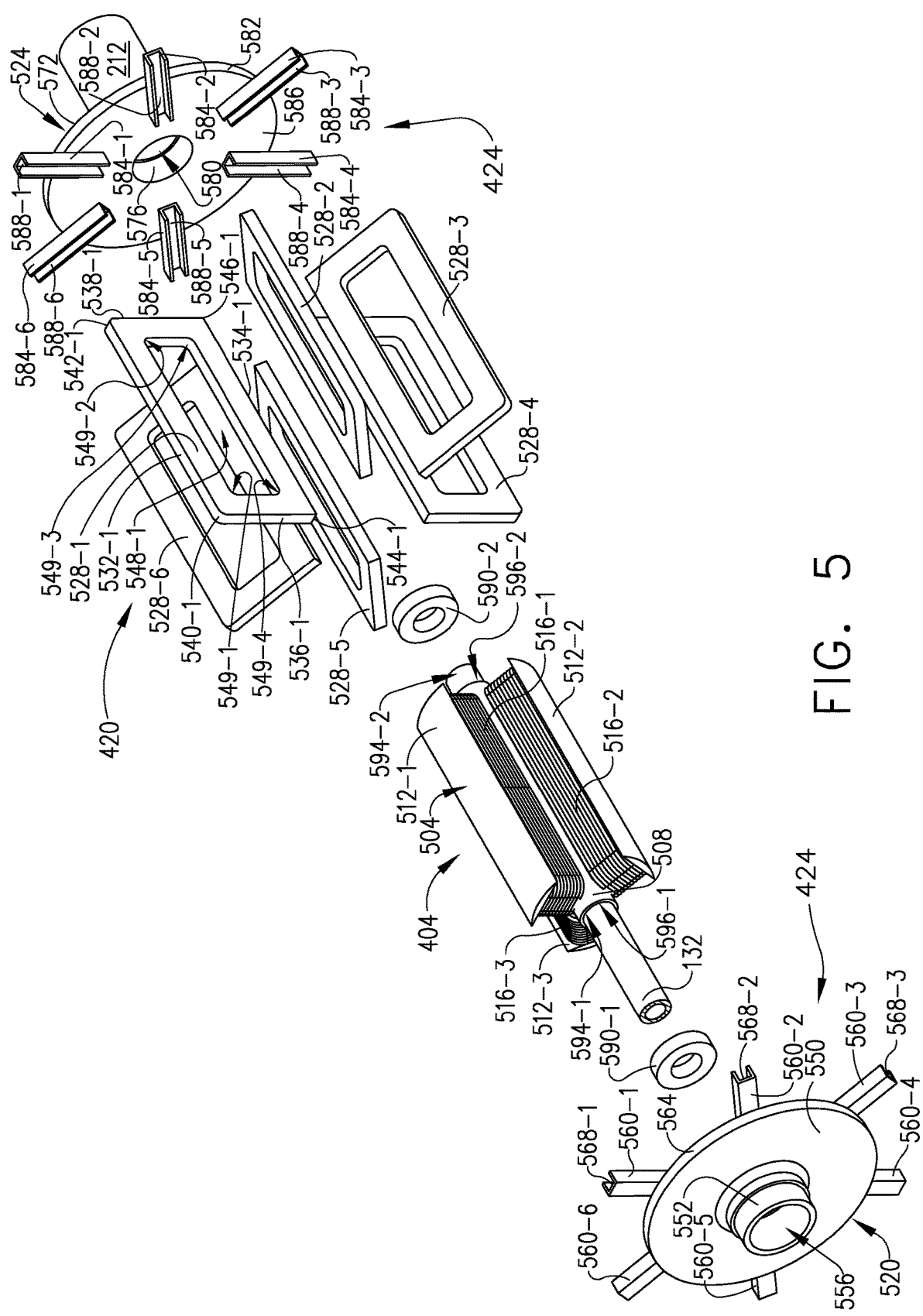
FIG. 5 is another successive exploded view showing the subassembly of the inner exciter rotor and the outer carrier rotor of FIG. 4, along with their respective components.

Referring now to FIG. 5, inner exciter rotor 404 comprises a coil mount, indicated generally by arrow 504, which is mounted on, secured to, associated with, etc., drive/input shaft 132 by a central hub section, indicated as 508. Coil mount 504 further comprises a plurality of coil mounting sections radiating outwardly from central hub section 508, of which three are indicated, respectively, as 512-1 through 512-3. The total number of such coil mounting sections 512 can vary, but may be in the range of, for example, from two to upwards of twelve, such as from three to six, and may be an odd number or even number of such sections 512. Each of coil mounting sections 512-1 through 512-3 receives thereon an electrical induction coil, indicated, respectively as 516-1 through 516-3.

Figure 4:
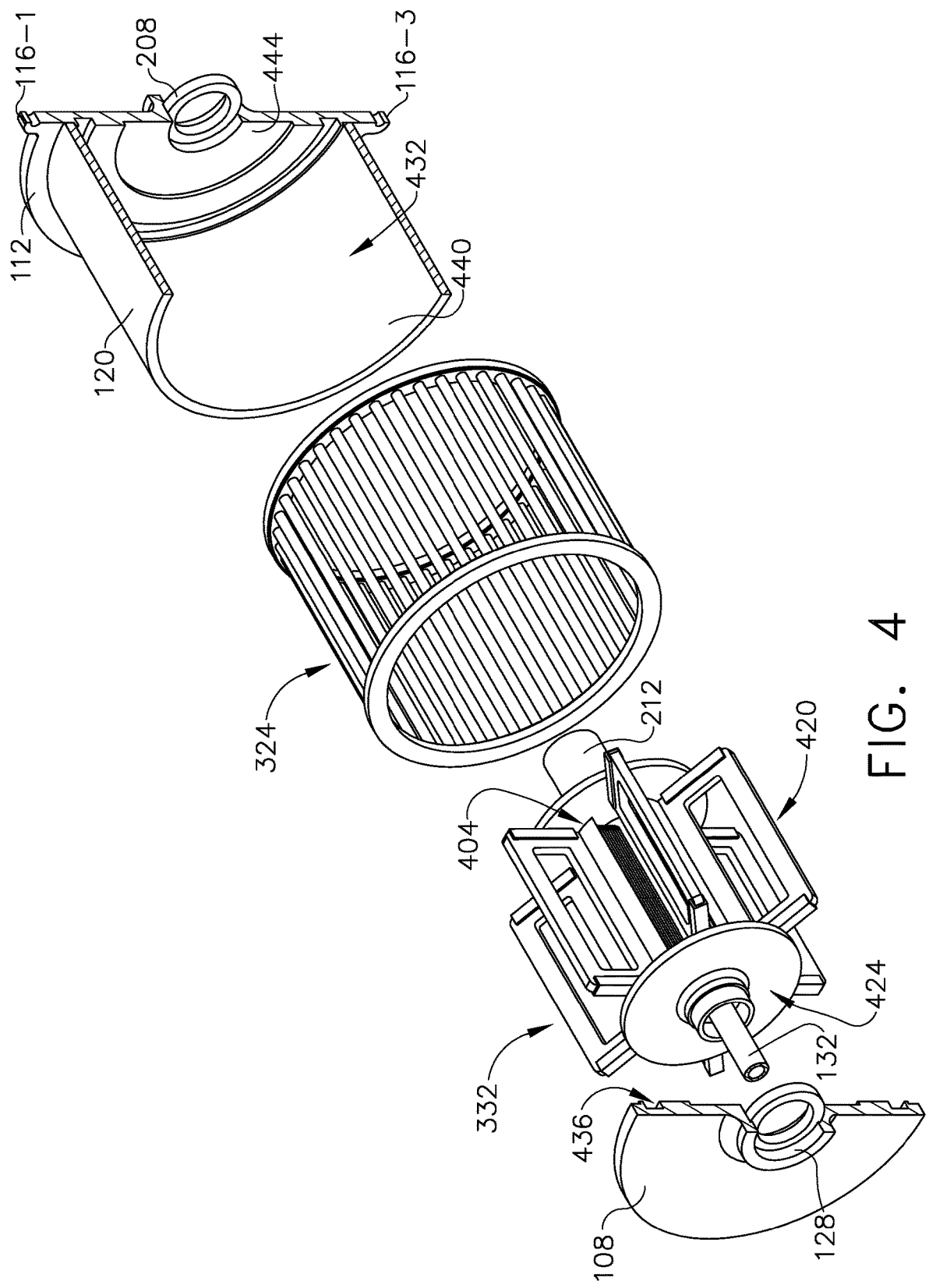
FIG. 4 is a successive exploded view of the embodiment of the device of FIG. 1 showing sectional portions of the housing, casing, etc., the subassembly of the inner exciter rotor and the outer carrier rotor of the device, and the outer stator of device.

Outer carrier rotor 420 may comprise a forward carrier induction plate mounting hub, indicated generally by arrow 520, a rear carrier induction plate mounting hub, indicated generally by arrow 524, spaced laterally apart from forward hub 524, and a plurality of conductive elements in the form of, for example, generally rectangular-shaped carrier induction plates (each made of an electrically conductive material) 528, of which six are shown as 528-1 through 528-6, but for which the total number may vary, the six shown in FIG. 5 being simply illustrative. As shown in FIGS. 4 and 5, carrier induction plates 528-1 through 528-6 are circumferentially spaced apart about the axis defined by drive/input shaft 132. The number of such induction plates 528 may be in the range, for example, from two to upwards of twelve, such as from three to six, and may be an odd number or even number of such plates 528. Referring to induction plate 528-1, which is representative of induction plates 528-1 through 528-6, each such induction plate may have a pair of spaced apart long outer and inner edges, indicated respectively as 532-1 and 534-1 for plate 528-1, connecting to a pair of spaced apart short side edges, indicated respectively as 536-1 and 538-1 for plate 528-1, at the four respective corners, indicated as 540-1, 542-1, 544-1, and 546-1 for plate 528-1. As shown in FIG. 5, outer corners 540-1 and 542-1 are somewhat rounded relative to inner corners 544-1 and 546-1. In addition, each such carrier induction plate 528 may have an interior generally rectangular-shaped space, for example, as indicated generally by arrow 548-1 for carrier induction plate 528-1. As also shown in FIG. 5, the interior corners, indicated a 549-1 through 549-4, of carrier induction plate 528-1 which define space 548-1 are also somewhat curved or rounded, similar in curvature to outer corners 540-1 and 542-1. Because of interior space 548-1, carrier induction plate 528-1 forms an electrical circuit when electrical current is induced to flow therethrough.

As also shown in FIG. 5, forward carrier induction plate mounting hub 520 may comprise a generally circular-shaped forward hub section, indicated as 550, having a bearing mounting portion 552 provided with a generally cylindrical-shaped bore indicated by arrow 556, with a first set of generally U-shaped carrier induction plate mounting brackets 560, six of which are indicated as 560-1 through 560-6, which may be attached to, connected to, or otherwise secured to inner surface 564 of forward hub section 550, and which radiate outwardly relative to bore 556. Each of carrier induction plate mounting brackets 560-1 through 560-6 have an inwardly facing, generally U-shaped carrier induction plate receiving recess, of which three such recesses of the six total are indicated by arrows 568-1 through 568-3 for brackets 560-1 through 560-3.

Rearward carrier induction plate mounting hub 532 may similarly comprise a generally circular-shaped rear hub section, indicated as 572, having a bearing mounting portion 576 with a generally cylindrical-shaped bore indicated by arrow 580. As also shown in FIG. 5, driven/output shaft 212 is attached to, connected to, or otherwise secured to outer surface 582 of rear hub section 572. A second set of generally U-shaped carrier induction plate mounting brackets 584, six of which are indicated as 584-1 through 584-6, may be attached to, connected to, or otherwise secured to inner surface 586 of rear hub section 572 and may radiate outwardly from bore 580 (similar to brackets 560-1 through 560-6). Each of carrier plate mounting brackets 584-1 through 584-6 have an inwardly facing, generally U-shaped carrier induction plate receiving recess, indicated, respectively, by arrows 588-1 through 588-6, i.e., each of recesses 588-1 through 588-6 face towards and are paired with one of respective recesses 568-1 through 568-6.

Brackets 560-1 through 560-6 receive and releasably secure the corresponding side edges 536 (e.g., side edge 536-1) of carrier induction plates 528-1 through 528-6 within recesses 568 (e.g., recesses 568-1 through 568-3 which are shown), while brackets 584-1 through 584-6 receive and releasably secure the corresponding side edges 532 (e.g., side 532-1) of carrier induction plates 528-1 through 528-6 within respective recesses 588-1 through 588-6 to thus provide the integrated carrier frame of outer carrier rotor 420. Each of recesses 568-1 through 568-1, as well as recesses 588-1 through 588-6 may be insulated, and/or each of mounting brackets 560-1 through 560-6, as well as mounting brackets 584-1 through 584-6 may be made of a nonconductive material such that electrical current flows only through carrier induction plates 528-1 through 528-6. Also shown in FIG. 5 are a first set of bearings, indicated as forward bearing 590-1 and rear bearing 590-2. Forward bearing 590 1 may be secured within bore 556 of forward bearing mount 552 for rotatably mounting the section of drive/input shaft 132, indicated by arrow 594-1, proximate forward end 596-1 of central hub section 308, while rear bearing 590-2 may be secured within bore 580 of rear bearing mount 576 for rotatably mounting the rear end, indicated by arrow 594-2, of drive/input shaft 132 proximate rearward end 596-2 of central hub section 308. When forward carrier hub 520, induction plates 528-1 through 528-6, and rearward carrier hub 532 assembled are combined and assembled together, induction plates 528-1 through 528-6 are thus fixed into a relatively rigid structure within the combination of mounting brackets 560-1 through 560-6 and 584-1 through 584-6 of carrier frame 424 of outer carrier rotor 420.

Figure 6:
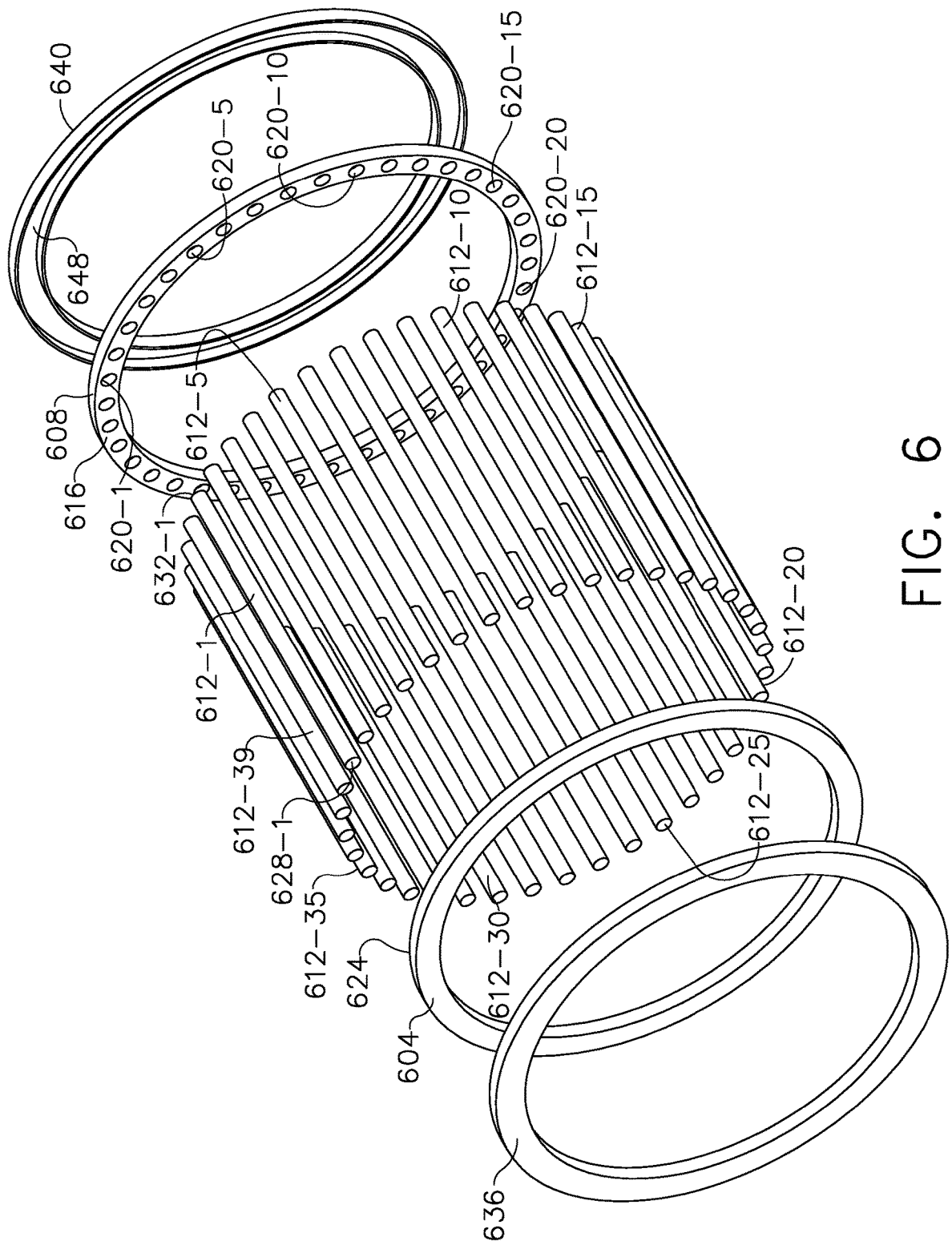
FIG. 6 is another successive exploded view showing the outer stator of FIG. 4, along with its respective components.

Referring to FIG. 6, outer stator 324 (illustrated in FIG. 6 in what is generally referred to as a "squirrel cage-type" configuration or assembly) may comprise a generally annular-shaped forward shorting ring 604 and a generally annular-shaped rear shorting ring 608 laterally spaced apart from forward shorting ring 604. As also shown in FIG. 6, outer stator 324 further comprises a plurality of circumferentially spaced apart stator bars 612 (made from electrically conductive material), which may be generally cylindrical-shaped as shown in FIG. 6, but which may also have other cross-sectional shapes, such as, for example, square-shaped, rectangular-shaped, etc. Thirty-nine stator bars 612 are shown and illustrated in FIG. 6, of which are nine indicated as 612-1, 612-5, 612-10, 612-15, 612-20, 612-25, 612-30, 612-35, and 612-39, but may be a number which is lesser or greater than thirty nine, and may be an odd number or even number of such stator bars 612. Although not shown in FIG. 6, these stator bars 612-1 through 612-39 may also be provided with, at either end thereof, but only one end, of each stator bar a current direction controlling diode (e.g., a semiconductor diode) for directing the electrical current in one direction through each of stator bars 612-1 through 612-39.

The inner surface 616 of rear shorting ring 608 is also shown as having a plurality (i.e., thirty-nine) of corresponding inward facing generally cylindrical-shaped and circumferentially spaced apart recesses formed therein, five of which are indicated by arrows 620-1, 620-5, 620-10, 620-15, and 620-20. Similar corresponding inward facing generally cylindrical-shaped recesses (not shown) like those of 620-1 through 620-20 are also formed in the inner surface 624 of forward shorting ring 604. Referring for purposes of illustration to stator bar 612-1, which has a forward end 628-1 and rear end 632-1, each of the inward facing recesses of forward shorting 604 may receive and may releasably secure the forward end 628 of one such stator bar 612, while each of the inward facing recesses 620 may receive and may releasably secure the rearward end 632 of one such stator bar 612. As further shown in FIG. 6, a forward insulating ring, indicated as 636, and a rear insulating ring 640 may also be provided. As shown in FIG. 6, rear insulating ring 640 may have formed therein an inwardly facing generally annular-shaped recess, indicated as 648, which may receive and may releasably secure rear shorting ring 608. A similar inwardly facing generally annular-shaped recess (not shown) may also formed in forward insulating ring 636 which may receive and may releasably secure forward shorting ring 604.

Figure 7:
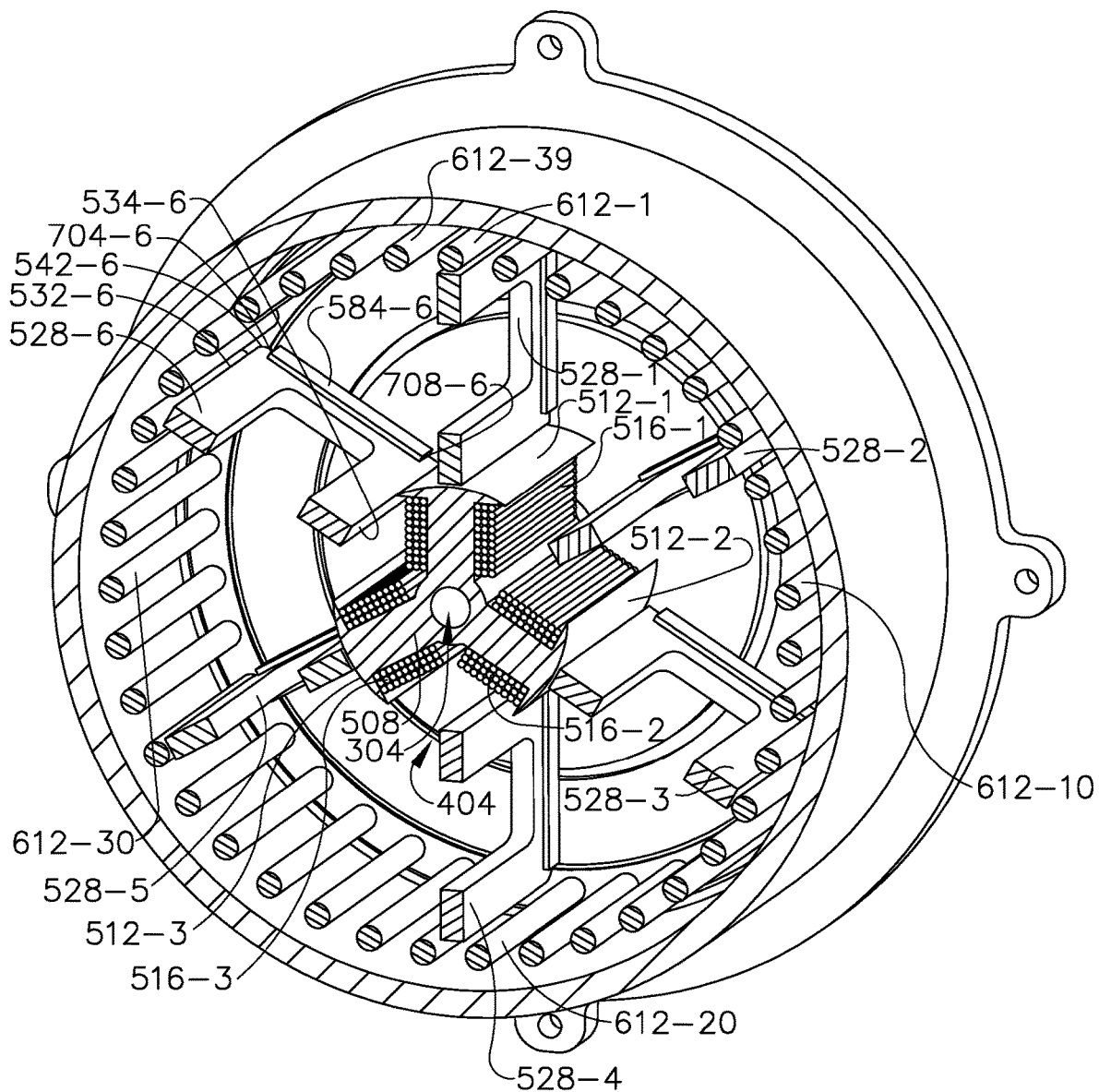
FIG. 7 is an upright transverse sectional view of the device of FIG. 1.

As further shown in FIG. 7, and as illustrated specifically with respect to carrier induction plate 528-6, outer long edge 532-6 of carrier induction plate 528-6 may extend outwardly beyond outer end 704-6 of carrier induction plate mounting bracket 584-6. As also shown in FIG. 7, inner long edge 534-6 of carrier induction plate 528-6 may extend inwardly beyond inner end 708-6 of bracket 584-6. Similarly, and as shown FIG. 8, the respective outer long edge 532-1 and inner long edge 534-1 of carrier induction plate 528-1 may extend outwardly beyond the outer end 704-1 of carrier induction plate mounting bracket 584-1, while inner long edge 534-1 of plate 528-1 may extend inwardly beyond inner end 708-1 of bracket 584-1. Similarly, and as also shown in FIG. 8, the respective outer long edge 532-1 and inner long edge 534-1 of carrier induction plate 528-1 may extend outwardly beyond the outer end 804-1 of carrier induction plate mounting bracket 560-1, while inner long edge 534-1 of plate 528-1 may extend inwardly beyond inner end 808-1 of bracket 560-1.

Figure 8:
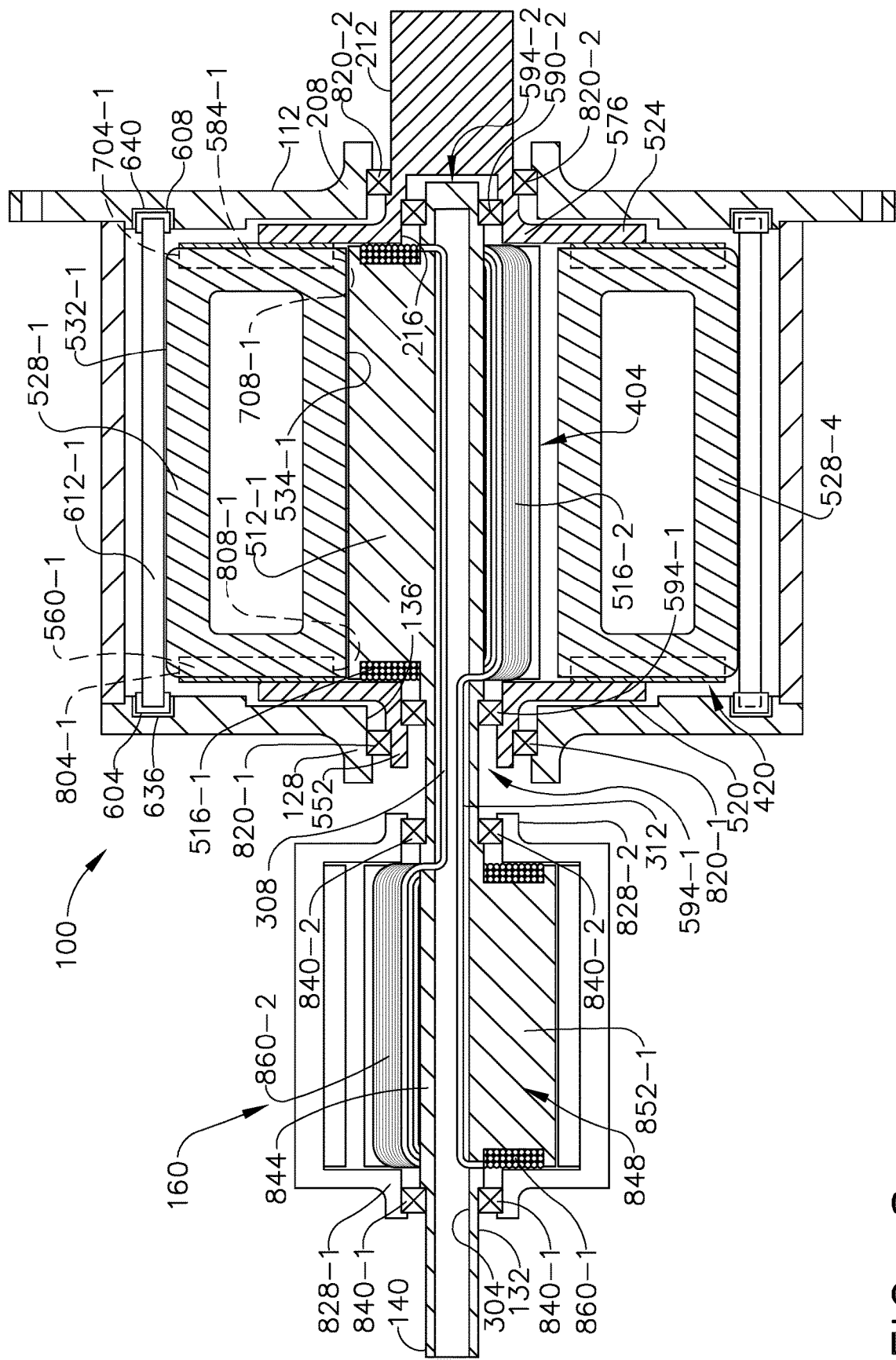
FIG. 8 is three-dimensional cross-sectional view of the embodiment of the device of FIG. 1, in combination with the electrical generator.

As further shown in FIG. 8, motor 100 may be provided with a second set of bearings, indicated as a forward bearing 820-1 and indicated as rear bearing 820-2. Forward bearing 820-1 may be secured within bore 136 of bearing mount 136 for rotatably mounting forward hub 552 of outer carrier rotor 420, while rear bearing 820-2 may be secured within bore 216 of rear bearing mount 208 for rotatably mounting rear hub 576 of carrier frame 424 of outer carrier rotor 420. As also shown in FIG. 8, electrical generator 160 includes a forward bearing mount 828-1 and a rear bearing mount 828-2 for securing a third set of bearings, indicated as forward bearing 840-1 and rear bearing 840-2. Forward bearing 840-1 and 840-2 may rotatably mount drive/input shaft 132 within electrical generator 160, shaft 132 being secured to a central hub section, indicated as 844, of a coil mount, indicated generally as 848, of electrical generator 160. Coil mount 848 further comprises as plurality of coil mounting sections radiating outwardly from central hub section 844, of which only one, indicated as 852-1, of three such coil mounting sections, is shown in FIG. 8. Coil mounting section 852-1 receives one electrical coil of electrical generator 160, indicated as 860-1. As further shown in FIG. 8, coil 860-1 may be connected to wire 312 which is also connected to electrical coil 516-2 of inner exciter rotor 404. Similarly, coil 516-1 of inner exciter rotor 404 may be connected to wire 308 which is also connected to coil 860-2 of electrical generator 160, to thus form a complete electrical circuit.

Referring to FIG. 8, as drive/input shaft 132 rotates about, around, etc., its longitudinal axis, it causes electrical generator 160 to create (generate) an electrical current. The electrical current generated by electrical generator 160 may be transmitted to inner exciter rotor 404, for example, by wire 308 which may be connected from electrical coil 860-2 of electrical generator 160 to electrical induction coil 516-1 of inner exciter rotor 404, as shown in FIG. 8. The electrical circuit between inner exciter rotor 404 and electrical generator 160 may be completed by wire 312 which is shown in FIG. 8 as being connected from electrical induction coil 516-2 of inner exciter rotor 404 to electrical coil 860-1 of electrical generator 160.

As drive/input shaft 132 rotates, it also causes inner exciter rotor 404 to rotate about, around, etc., its longitudinal axis which is also common with the longitudinal axis of shaft 132. The rotation of inner exciter rotor 404 causes the electrical current moving through electrical induction coils 516-1 through 516-3 to generate a rotating (moving) magnetic field. The rotating magnetic field generated by electrical induction coils 516-1 through 516-3 (due to the rotation of inner exciter rotor 404) induces an electrical current to flow in each of electrically conductive carrier induction plates 528-1 through 528-6 of outer carrier rotor 420. The electrical current induced to flow through each of plates 528-1 through 528-6 of outer carrier rotor 420 interacts with electrically conductive stator bars 612 of outer stator 324. This interaction between the induced electrical current flowing through each of plates 528-1 through 528-6 of outer carrier rotor 420 and stator bars 612 of outer stator 324 causes carrier frame 424 of outer carrier rotor 420 to thus rotate about, around, etc., its longitudinal axis which is common with the longitudinal axis of inner exciter rotor 404 and drive/input shaft 13. In other words, carrier frame 424, as well as outer carrier rotor 420 are co-axial and concentric with inner exciter rotor 404. Because driven/output shaft 212 is connected with or to rear carrier induction plate mounting hub 524 of outer carrier rotor 420, as carrier frame 424 of outer carrier rotor 420 rotates about, around, etc., its longitudinal axis, driven/output shaft 212 likewise rotates its longitudinal axis, which is also in common with the longitudinal axis of carrier frame 424/outer carrier rotor 420.

Figure 9:
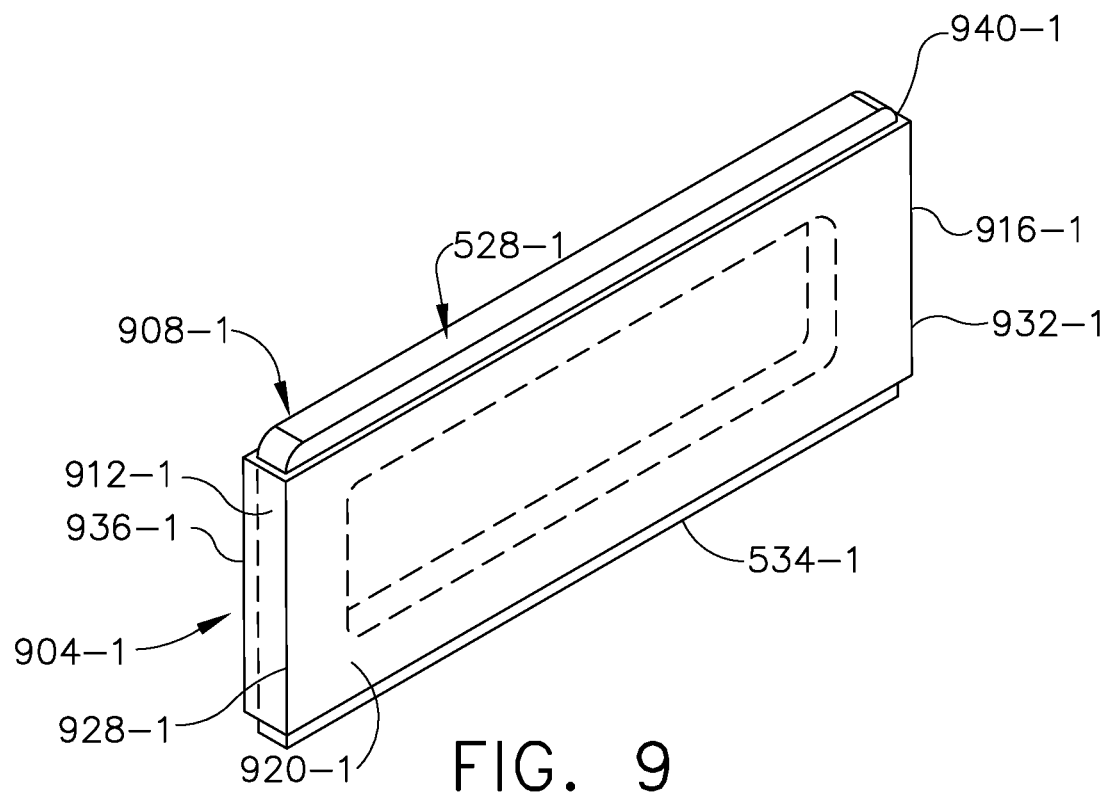
FIG. 9 is a perspective view of an embodiment of an alternate carrier induction plate mounting bracket.

FIG. 9 shows an alternate embodiment of outer carrier rotor 420 to provide increased structural strength and rigidity for carrier frame 424, with the first and second sets of induction plate mounting brackets 560-1 through 560-6 and 584-1 through 584-6 being replaced with a corresponding set of induction plate mounting brackets which provide a slot for receiving one of carrier induction plates 528-1 through 528-6. Referring to FIG. 9, one such induction plate mounting bracket having a generally quadrilateral box-like shape is indicated generally as 904-1, and is shown as receiving and securing carrier induction plate 528-1 within a slot, indicated generally by arrow 908-1, such that edges 532-1 and 534-1 extend beyond slot 908-1. Slot 908-1 is defined by a first side section, indicated as 912-1, and a second side section, indicated as 916-1 which is laterally spaced apart from first side 912-1. Slot 908-1 is further defined by a first generally rectangular main section, indicated as 920-1 and a second generally rectangular main section, indicated as 924-1. First main section 920-1 is connected to first side section 912-1 at edge 928-1 and to second side section 916-1 at edge 932-1. Similarly, second main section 924-1 is connected to first side section 912-1 at edge 936-1, and to second side section 912-1 at edge 940-1. Similar to mounting bracket 560-1, first side section 912-1 of mounting bracket 904-1 may be attached to, connected to, or otherwise secured to inner surface 564 of forward hub section 550, while second side section 916-1 of mounting bracket 904-1 may be attached to, connected to, or otherwise secured to inner surface 586 of rear hub section 572. Mounting bracket 904-1 may be made of nonconductive material and/or those portions of side sections 912-1/916-1 and main sections 920-1/924-1 in contact with carrier induction plate 528-1 may be insulated.

Figure 10:
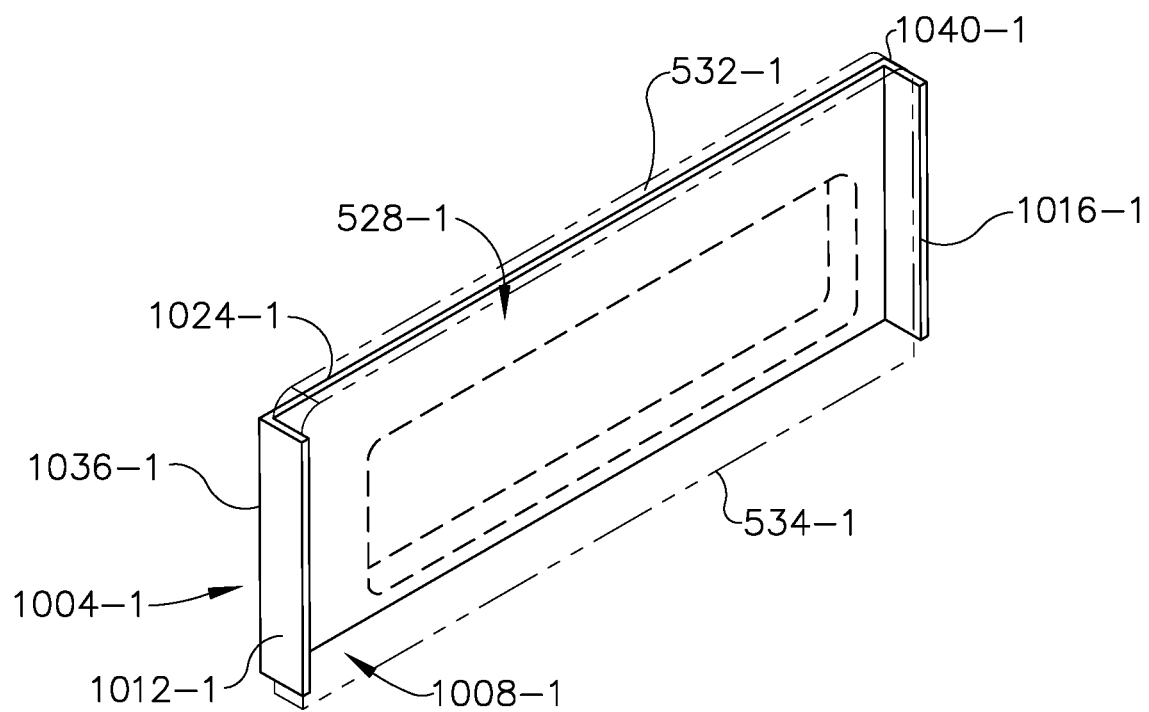
FIG. 10 is a perspective view of an embodiment of another alternate carrier induction plate mounting bracket.

FIG. 10 shows another alternate embodiment of outer carrier rotor 420 to also provide increased structural strength and rigidity for carrier frame 424, with the first and second sets of induction plate mounting brackets 560-1 through 560-6 and 584-1 through 584-6 being replaced instead with a corresponding set of induction plate mounting brackets which provide a recess for receiving one of carrier induction plates 528-1 through 528-6. Referring to FIG. 10, one such induction plate mounting bracket indicated generally as 1004-1, and is shown as receiving and securing carrier induction plate 528-1 within an elongated generally C-shaped recess, indicated generally by arrow 1008-1, such that edges 532-1 and 534-1 extend beyond recess 1008-1. Recess 1008-1 is defined by a first side section, indicated as 1012-1, and a second side section, indicated as 1016-1 which is laterally spaced apart from first side 1012-1. Recess 1008-1 is further defined by a generally rectangular main section, indicated as 1024-1. Main section 1024-1 is connected to first side section 1012-1 at edge 1036-1 and to second side section 1016-1 at edge 1040-1. Similar to mounting bracket 560-1, first side section 1012-1 of mounting bracket 1004-1 may be attached to, connected to, or otherwise secured to inner surface 564 of forward hub section 550, while second side section 1016-1 of mounting bracket 1004-1 may be attached to, connected to, or otherwise secured to inner surface 586 of rear hub section 572. Like mounting bracket 904-1, mounting bracket 1004-1 may be made of nonconductive material and/or those portions of side sections 1012-1/1016-1 and main section 1020-1 in contact with carrier induction plate 528-1 may be insulated.

Figure 11:
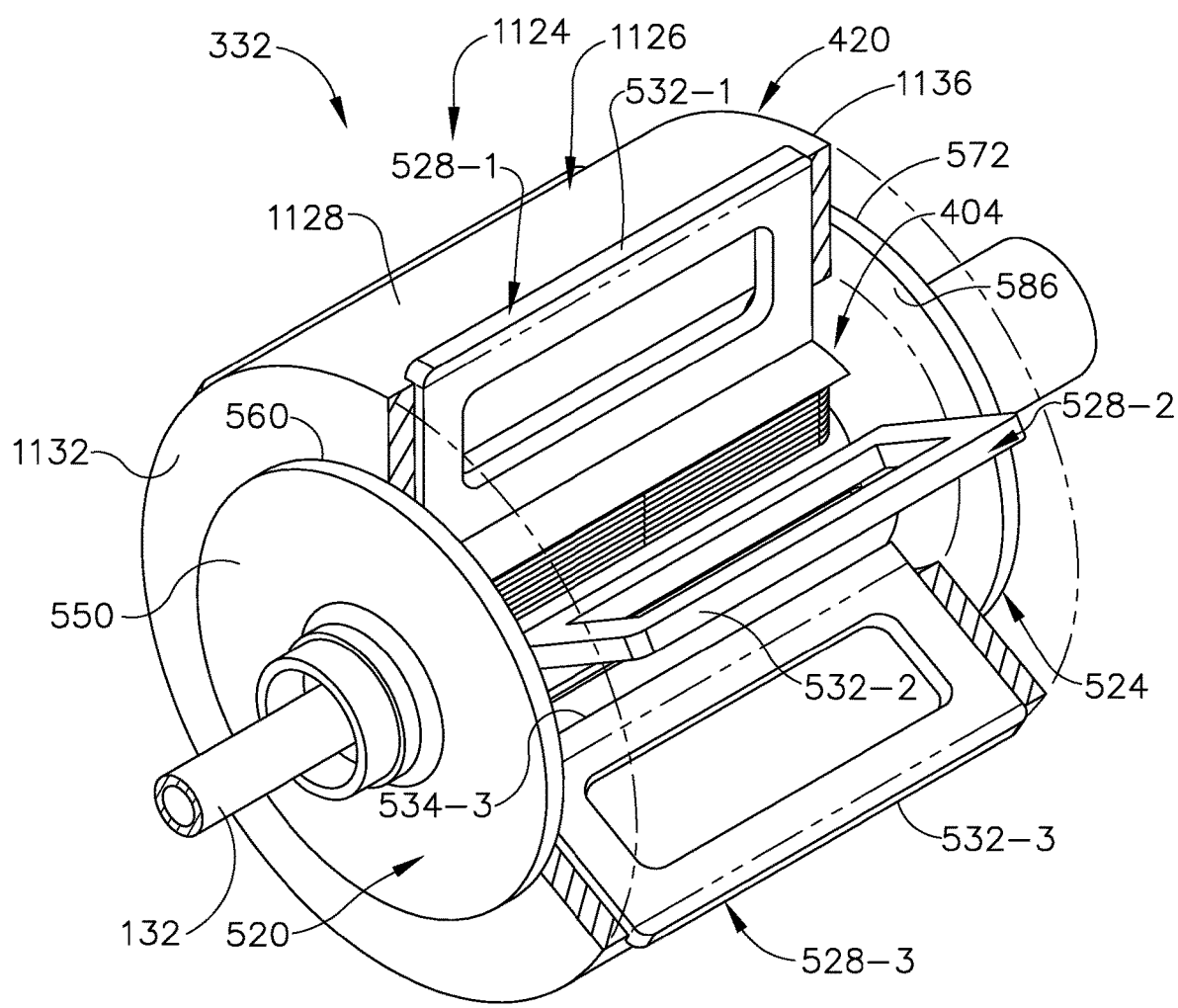
FIG. 11 is a perspective view of the exciter/carrier subassembly showing an alternate embodiment of the rotatable carrier frame with a portion thereof removed.
Figure 12:
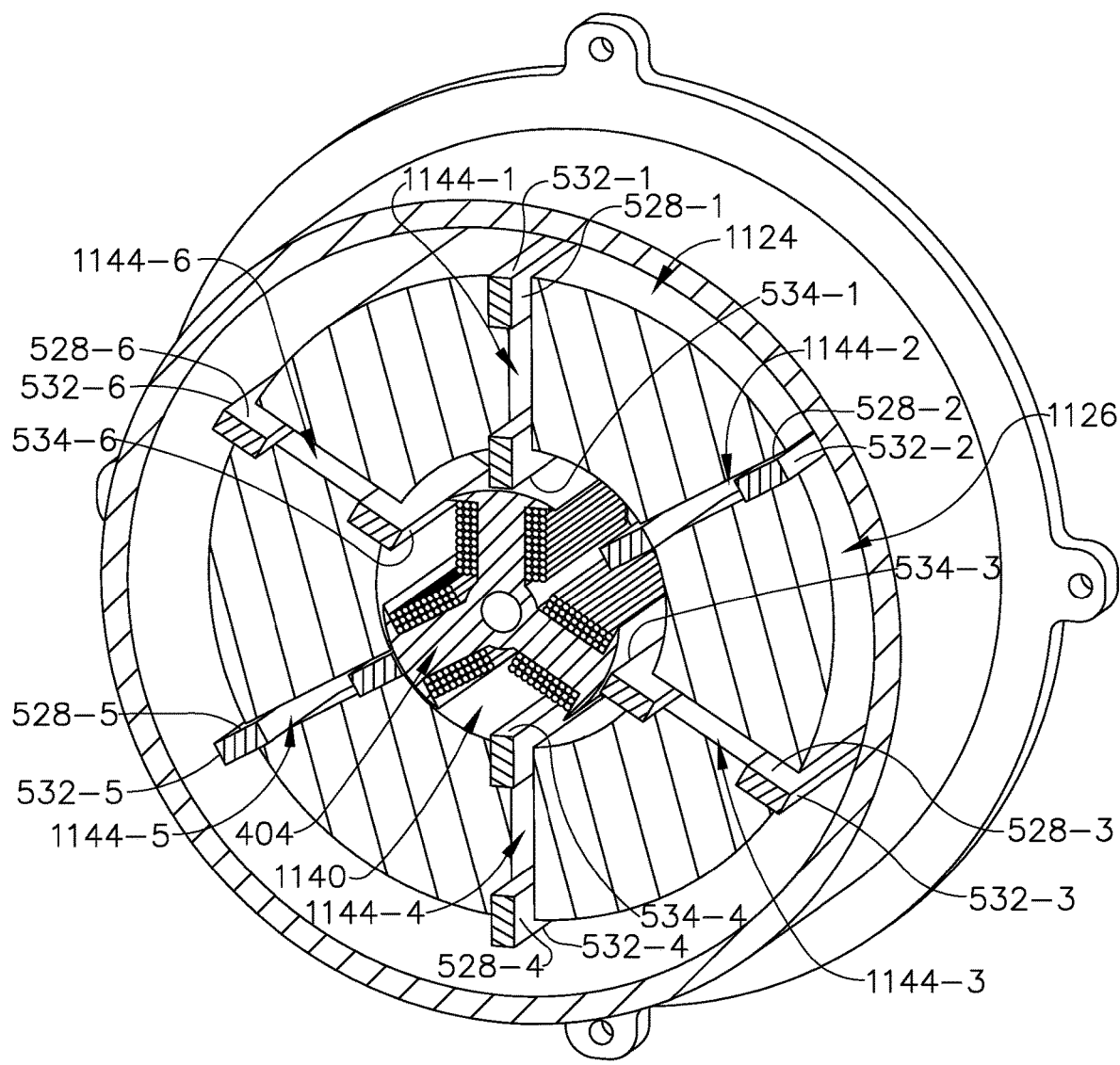
FIG. 12 is an upright transverse sectional view similar to that of FIG. 7 of the alternate carrier frame of FIG. 11 with the outer stator removed.

FIG. 11 shows exciter/carrier subassembly 332 with an alternate embodiment of the rotatable carrier frame, indicated as 1124, to be used in place of carrier frame 424 in outer carrier rotor 420. Referring to FIGS. 11 and 12, alternate rotatable carrier frame 1124 includes a generally cylindrically-shaped central carrier section, indicated as 1126. Central carrier section 1126 has an outer circumferential surface, indicated as 1128. Central carrier section 1126 also has a front circularly-shaped surface 1132, and a rear circularly-shaped surface 1136 laterally spaced apart from front surface, the front surface 1132 and back surface 1136 being connected by outer circumferential surface 112. Front surface 1132 may be attached to, connected to, or otherwise secured to inner surface 564 of forward hub section 550, while rear surface 1136 may be attached to, connected to, or otherwise secured to inner surface 564 of rear hub section 572. Central carrier section 1126 is provided with or has formed therein a generally cylindrically-shaped central bore (see FIG. 12), indicated by arrow 1140, which extends from front surface 1132 to rear surface 1136 and through which drive/input shaft 132 extends. Central carrier section 1126 is also provided with or has formed therein six circumferentially spaced apart, and generally rectangular-shaped slots, indicated by arrows 1144-1 through 1144-6. Each of slots 1144-1 through 1144-6 is positioned between front surface 1132 and rear surface 1134, and extends from outer surface 1128 inwardly to central bore 1140. Each of slots 1144-1 through 1144-6 receives and releasably secures one of carrier induction plates 528-1 through 528-6 such that outer edges 532-1 through 532-6 extend outwardly beyond outer surface 1128, and such that inner edges 532-1 through 532-6 extend inwardly into central bore 1140.

Figure 13:
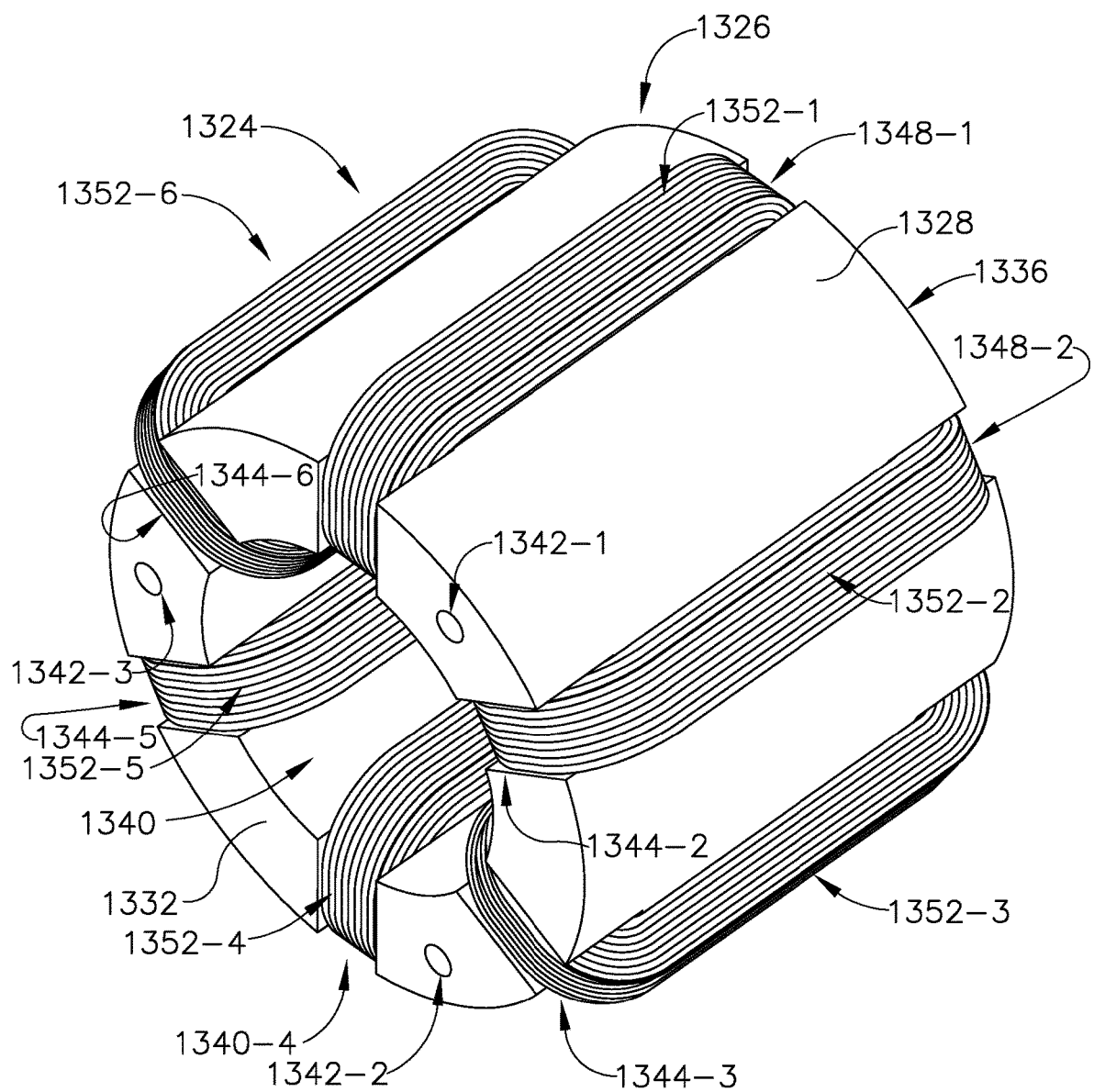
FIG. 13 is a perspective view of an alternate embodiment of the carrier frame of FIG. 11 using an alternate embodiment of the conductive elements for the outer carrier rotor.

FIG. 13 shows an alternate embodiment of rotatable carrier frame 1124, indicated generally as 1324. Similar to carrier frame 1124, carrier frame 1324 also includes a generally cylindrically-shaped central carrier section, indicated as 1326. Central carrier section 1326 also has an outer circumferential surface, indicated as 1328, a front circularly-shaped surface 1332 (although not shown in FIG. 13, may be attached to, connected to, or otherwise secured to inner surface 564 of forward hub section 550), and a rear circularly-shaped surface 1336 (although not shown in FIG. 13, may also be attached to, connected to, or otherwise secured to inner surface 564 of rear hub section 572). Central carrier section 1326 is also provided with or has formed therein a generally cylindrically-shaped central bore, indicated by arrow 1340, which extends from front surface 1332 to rear surface 1336. As further shown in FIG. 13, front surface 1332 of outer carrier section 1326 may have formed therein apertures, holes, etc., three of which are indicated as 1342-1 through 1342-3, for mounting outer carrier section 1326 to, for example, forward carrier mounting hub 520. Corresponding mounting apertures (not shown) may also be formed in rear surface 1336 for mounting outer carrier section 1326 to, for example, rearward carrier mounting hub 524.

As further shown in FIG. 13, front surface 1332 of central carrier section 1326 is provided with or has formed therein a plurality of circumferentially spaced apart front notches, of which six are indicated by arrows 1344-1 through 1344-6, each of which extends from outer surface 1328 to central bore 1340. As further shown in FIG. 13, rear surface 1332 of central carrier section 1326 is also provided with or has formed therein six circumferentially spaced apart rear notches 1348, of which only two are shown in FIG. 13, and are indicated by arrows 1348-1 and 1348-2. Each of rear notches 1348 also extends from outer surface 1328 to central bore 1340. Each of forward notches 1344 are also paired and aligned with one of corresponding rear notches 1348. As further shown in FIG. 13, outer carrier rotor 1326 uses an alternate embodiment of the conductive elements in the form of six generally oval-shaped conductive wire induction coils, indicated by arrows 1352-1 through 1352-6. As further shown in FIG. 13, each of wire induction coils 1352-1 through 1352-6 are received and releasably secured by a respective and corresponding pair of forward notches 1344, and rear notches 1348.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

In addition, the purpose of the Abstract of the Disclosure in this application is to enable the U.S. Patent and Trademark Office, as well as the public generally, including any scientists, engineers and practitioners in the art who may not be familiar with patent or other legal terms or phraseology to determine the what the technical disclosure of the application describes. Accordingly, while the Abstract of the Disclosure may be used to provide enablement for the following claims, it is not intended to be limiting as to the scope of those claims in any way.

Finally, it is the applicant's intent that only claims which include the express language "means for" or "step for" be interpreted under 35 U.S.C. § 112, paragraph 6. Accordingly, claims that do not expressly include the phrase "means for" or "step for" are not to be interpreted as being within the purview of 35 U.S.C. § 112, paragraph 6, or to be construed as being subject to any case law interpreting the meaning of these phrases.

What is claimed is:

1. A device comprising a brushless dual rotor electromagnetic induction motor, the induction motor comprising:
    an inner exciter rotor having a rotatable drive/input shaft, the inner exciter rotor generating a magnetic field when the drive/input shaft is rotated;
    an outer carrier rotor surrounding the inner exciter rotor and being co-axial and concentric therewith, the outer carrier rotor having a rotatable conductive frame and a plurality of circumferentially spaced apart conductive elements associated with the rotatable carrier frame such that an electrical current can be induced to flow through the conductive elements in response to the magnetic field as the drive/input shaft rotates, wherein the conductive elements comprise a plurality of conductive carrier induction plates, wherein the rotatable carrier frame is mounted for rotation about an axis defined by the drive/input shaft, and wherein the rotatable carrier frame comprises:
        a forward carrier induction plate mounting hub; a rear carrier induction plate mounting hub laterally spaced apart from the forward carrier induction plate mounting hub; and
        a plurality of induction plate mounting brackets connected to the forward and rear induction plate mounting hubs for receiving and securing the carrier induction plates, the induction plates being circumferentially spaced about the axis defined by the drive/input shaft;
    a rotatable driven/output shaft which rotates in response to rotation of the rotatable conductive frame; and
    an outer stator surrounding the outer carrier rotor and proximate the conductive elements which interacts with the induced electrical current flowing through the conductive elements to thereby cause the rotatable conductive frame to rotate.

2. The device of claim 1, wherein the inner exciter rotor has one or more electrical coils mounted on the drive/input shaft to generate the magnetic field when the driving/input shaft is rotated.

3. The device of claim 1, wherein the inner exciter rotor has one or more permanent magnets mounted on the drive/input shaft to generate the magnetic field when the drive/input shaft is rotated.

4. The device of claim 1, wherein the inner exciter rotor comprises: a coil mount having a central hub section mounted on the drive/input shaft, and a plurality of coil mounting sections radiating outwardly from the central hub section; and a plurality of electrical induction coils, each of the mounting sections receiving one of the electrical induction coils.

5. The device of claim 4, wherein the inner exciter rotor comprises from two to twelve coil mounting sections and from two to twelve electrical induction coils.

6. The device of claim 4, which further comprises an electrical generator which is electrically connected to the electrical induction coils to form an electrical circuit, and wherein as the drive/input shaft rotates, the electrical generator generates an electrical current which is transmitted to the electrical induction coils.

7. The device of claim 1, wherein the driven/output shaft is connected to the rotatable carrier frame for rotation about the axis of the drive/input shaft.

8. The device of claim 1 wherein the outer carrier rotor comprises from two to twelve conductive carrier induction plates.

9. The device of claim 1, wherein the outer stator has a squirrel cage-type configuration and comprises: a plurality of circumferentially spaced apart and electrically conductive stator bars each having a pair of spaced apart ends; a forward shorting ring for receiving and securing one end of each of the stator bars; and a rear shorting ring laterally spaced apart from the forward shorting ring for receiving and securing the other end of each of the stator bars.

10. A device comprising a brushless dual rotor electromagnetic induction motor, the induction motor comprising:
  a rotatable drive/input shaft;
  an inner exciter rotor generating a rotating magnetic field when the drive/input shaft is rotated, the inner exciter rotor having:
    a coil mount having a central hub section mounted on the drive/input shaft, and a plurality of coil mounting sections radiating outwardly from the central hub section; and
    a plurality of electrical induction coils, each of the mounting sections receiving one of the electrical induction coils;
  an outer carrier rotor surrounding the inner exciter rotor and being co-axial and concentric therewith, the outer carrier rotor having:
    a plurality of conductive carrier induction plates; and
    a rotatable carrier frame mounted for rotation about an axis defined by the drive/input shaft, the rotatable carrier frame comprising:
      a forward carrier induction plate mounting hub;
      a rear carrier induction plate mounting hub laterally spaced apart from the forward carrier induction plate mounting hub; and
      a plurality of induction plate mounting brackets connected to the forward and rear induction plate mounting hubs for receiving and securing the carrier induction plates, the induction plates being circumferentially spaced about the axis defined by the drive/input shaft, and such that an electrical current is induced to flow through each of the carrier induction plates in response to the rotating magnetic field generated by the inner exciter rotor;
  a driven/output shaft connected to the rotatable carrier frame for rotation about the axis of the drive/input shaft when the rotatable carrier frame rotates; and
  an outer stator surrounding the outer carrier rotor which interacts with the induced electrical current flowing through the conductive induction plates to thereby cause the rotatable carrier frame to rotate about the axis defined by the drive/input shaft, the outer stator having:
    a plurality of circumferentially spaced apart and electrically conductive stator bars each having a pair of spaced apart ends;
    a forward annular-shaped shorting ring for receiving and securing one end of each of the stator bars; and
    a rear annular-shaped shorting ring laterally spaced apart from the forward shorting ring for receiving and securing the other end of each of the stator bars.

11. The device of claim 10, wherein the inner exciter rotor comprises from three to six coil mounting sections and from three to six electrical induction coils.

12. The device of claim 11, wherein the inner exciter rotor comprises three coil mounting sections and three electrical induction coils.

13. The device of claim 11, which further comprises an electrical generator which is electrically connected to the electrical induction coils to form an electrical circuit, and wherein as the drive/input shaft rotates, the electrical generator creating an electrical current which is transmitted to the electrical induction coils.

14. The device of claim 11, wherein the outer carrier rotor comprises from three to six conductive carrier induction plates, each of the carrier induction plates being generally rectangular in shape.

15. The device of claim 14, wherein each of the carrier induction plates have a pair of spaced apart side edges, wherein the plurality of induction plate mounting brackets comprise a first set of mounting brackets connected to the forward induction plate mounting hub and a second set of mounting brackets connected to the rear induction plate mounting hub, the first set and second set of mounting brackets each having an inwardly facing carrier induction plate recess, each recess of the first set of mounting brackets being paired with a recess of the second set of mounting brackets, the side edges of each carrier induction plate being received and secured within one the paired recesses.

16. A device comprising a brushless dual rotor electromagnetic induction motor, the induction motor comprising:
  a rotatable drive/input shaft;
  an inner exciter rotor generating a rotating magnetic field when the drive/input shaft is rotated, the inner exciter rotor having:
    a coil mount having a central hub section mounted on the drive/input shaft, and a plurality of coil mounting sections radiating outwardly from the central hub section; and
    a plurality of electrical induction coils, each of the mounting sections receiving one of the electrical induction coils;
  an outer carrier rotor surrounding the inner exciter rotor and being co-axial and concentric therewith, the outer carrier rotor having:
    a plurality of conductive carrier elements; and
    a rotatable carrier frame mounted for rotation about an axis defined by the drive/input shaft, the rotatable carrier frame comprising:
      a forward carrier mounting hub;
      a rear carrier mounting hub laterally spaced apart from the forward carrier mounting hub; and
      a generally cylindrically-shaped central carrier section associated with the forward and rear carrier mounting hubs for receiving and securing the conductive carrier elements, the central carrier section having a central bore formed therein through which the drive/input shaft extends, the conductive carrier elements being circumferentially spaced apart by central carrier section about the axis defined by the drive/input shaft, and such that an electrical current is induced to flow through each of the conductive carrier elements in response to the rotating magnetic field generated by the inner exciter rotor;
  a driven/output shaft connected to the rotatable carrier frame for rotation about the axis of the drive/input shaft when the rotatable carrier frame rotates; and
  an outer stator surrounding the outer carrier rotor which interacts with the induced electrical current flowing through the conductive carrier elements to thereby cause the rotatable carrier frame to rotate about the axis defined by the drive/input shaft, the outer stator having:

a plurality of circumferentially spaced apart and electrically conductive stator bars each having a pair of spaced apart ends;

a forward annular-shaped shorting ring for receiving and securing one end of each of the stator bars; and a rear annular-shaped shorting ring laterally spaced apart from the forward shorting ring for receiving and securing the other end of each of the stator bars.

17. The device of claim 16, wherein the plurality of conductive carrier elements comprise a plurality of generally rectangular-shaped carrier induction plates, wherein the central carrier section has an outer circumferential surface and is provided with a plurality of circumferentially spaced apart, and generally rectangular-shaped slots, each of the slots extending from the outer circumferential surface to the central bore, each of the carrier induction plates being received and releasably secured within one of the slots.

18. The device of claim 17, which comprises from three to six carrier induction plates and wherein the central carrier section is provided with from three to six slots.

19. The device of claim 16, wherein the plurality of conductive carrier elements comprise a plurality of generally oval-shaped conductive wire induction coils, wherein the central carrier section has an front generally circular-shaped surface, a rear generally circular-shaped surface spaced apart laterally from the front surface, and an outer circumferential surface connecting the front surface to the back surface, the front surface having formed therein a plurality of circumferentially spaced apart notches, the back surface having formed therein a plurality of circumferentially spaced apart notches, each front notch being paired and aligned with a corresponding rear notch, each of the conductive wire induction coils being received and releasably secured by one aligned and corresponding pair of front and rear notches.

* * * * *